April 7, 1959  E. C. WAHL  2,881,015
SHAFT SEAL MEANS AND METHOD
Filed March 15, 1956
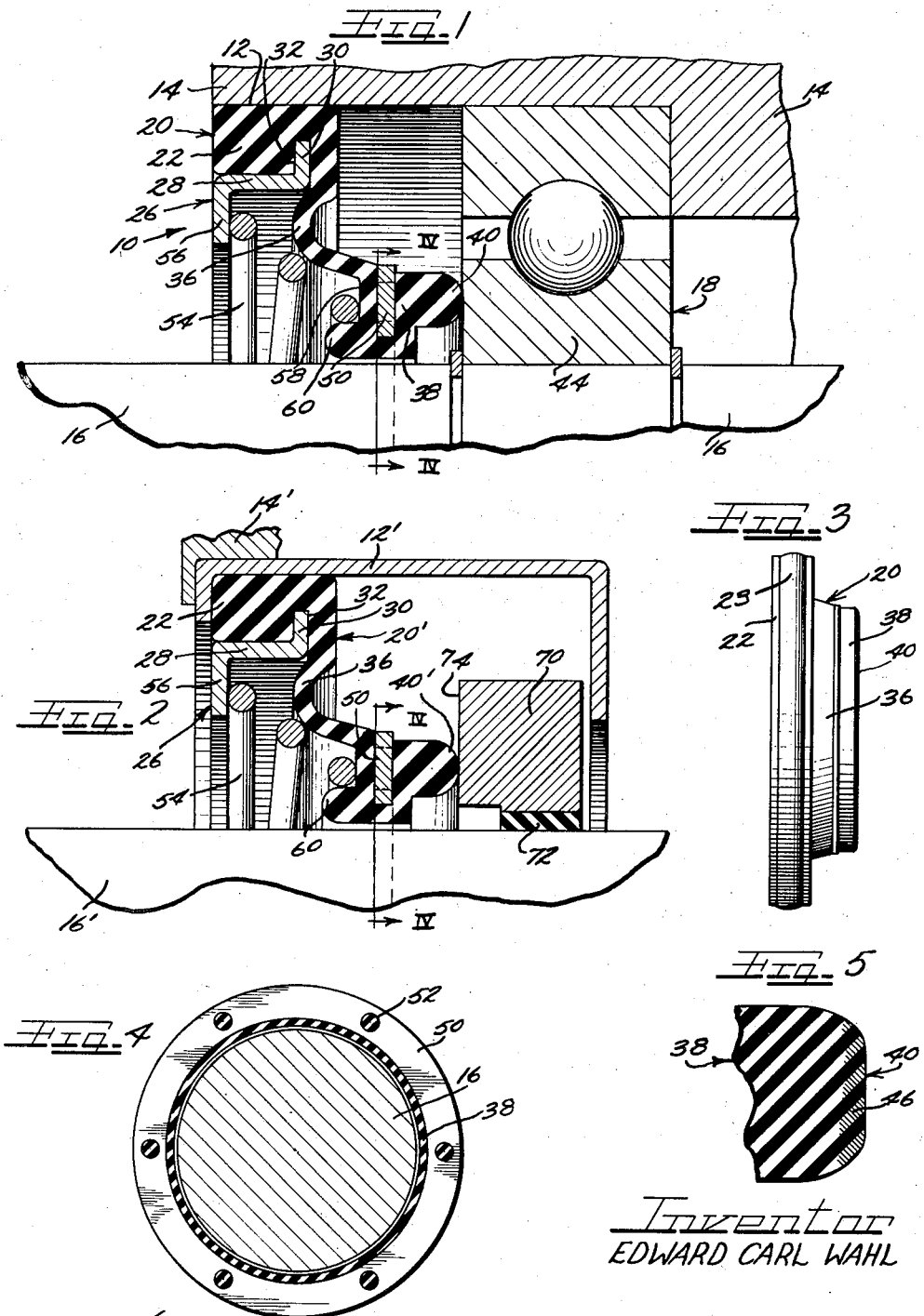
Inventor
EDWARD CARL WAHL United States Patent Office 2,881,015
Patented Apr. 7, 1959

2,881,015

SHAFT SEAL MEANS AND METHOD

Edward Carl Wahl, Arlington Heights, Ill., assignor to Gits Bros. Mfg. Co., Chicago, Ill., a corporation of Illinois Application March 15, 1956, Serial No. 571,718

3 Claims. (Cl. 286—11)

This invention relates to a seal of the relatively rotating face-to-face type wherein one face is hardenable and develops a long-wearing effective seal surface. Specifically, the invention relates to a shaft seal which develops its own seal face as it "wears in" in use.

An object of the present invention is to provide a seal having relatively rotating parts wherein one of the parts is initially pliable, matches itself into good sealing engagement with the other part, and then automatically surface hardens into a permanent matching fit with the other part to provide a wear resisting seal face.

Another object of the present invention is to provide a diaphragm-type shaft seal wherein the diaphragm member has a nose portion adapted to glaze harden, at least on its active sealing face, during an initial break in use of the seal.

A further object of the invention is to provide a shaft seal whose respective component parts are readily and economically manufactured and assembled and then develop wear resisting active mating faces during use of the seal.

In carrying out my invention in a preferred embodiment, I provide an axially actuated or loaded seal of the relatively rotating face-to-face type wherein one member is hard and wearable and the other member is pliable but will glaze harden at its active sealing face or nose, thus resisting wear and reducing friction. Desirably, the glaze-hardenable member is provided with a rigid ring to insure 360° of contact of the member and to aid in localizing the hardening to the zone of the seal face, avoiding undue loss of pliability in the main body, to retain take-up and seal load. The glazing effect will vary in relatively direct proportion to the speed and lubricating conditions effective around the seal and in some instances magnified visual inspection will be necessary to disclose the skin glaze while in other instances the entire seal nose will be as hard as carbon.

These and other objects, features, and advantages of the present invention will be readily apparent from the following description of illustrative embodiments thereof, taken in conjunction with the accompanying drawings, in which:

Figure 1 is a longitudinal cross-sectional view of a portion of a shaft seal constructed in accordance with the principles of the present invention;

Figure 2 is a longitudinal, cross-sectional view of a shaft seal illustrating a slightly modified construction;

Figure 3 is an elevational view of a diaphragm member of the seal of Figures 1 and 2;

Figure 4 is a transverse cross-sectional view of the sealing device, taken generally along lines IV—IV of Figures 1 and 2; and Figure 5 is a fragmental detail of a portion of the shaft seal shown in Figures 1, 2, and 3, illustrating diagrammatically a glazed, hardened condition of one of the sealing faces of the seal as effected by relative rotation of the rotating members.

As illustrative of principles of the present invention, there is shown in the drawings a shaft seal assembly 10 for providing a fluid-tight seal between an opening or bore 12 of a casing wall element 14 through which a shaft 16 extends.

In the embodiment of Figure 1, a bearing 18 is shown as carried by the wall 14 adjacent the inner end of bore 12, for supporting the shaft 16 for relative rotational movement with respect to the wall 14.

According to the principles of the present invention, a generally annular sealing ring 20 is provided to effectuate a seal between bore 12 and the shaft 16. The ring 20 is shown as a diaphragm formed from some heat hardenable elastomer or elastomeric material such as rubber, or rubber-like pliable material desirably into the generally bellow-like configuration shown.

The diaphragm member 20 accordingly comprises a first or outer sleeve or sleeve portion 22 which is shown fitted in the casing bore 12. The sleeve 22 is shown as having an integral rounded bead rim or flange 23 (Fig. 3) of a diameter great enough to engage the casing bore 12 with a forced fit and be flattened into tight sealing relation with the bore.

The sleeve portion 22 of diaphragm 20 is shown as reinforced by a rigid metal flanged cup or band 26 having a cylindrical portion 28 surrounded by the diaphragm sleeve 22. The inner end of the cylindrical portion 28 of band 26 is outwardly turned to provide an annular flange 30 which is snugly seated in a circumferentially extending groove 32 provided in the diaphragm sleeve 22. By the interengagement of the flange 30 and groove 32 the reinforcing band 26 and the diaphragm 20 are held in assembled relation.

The diaphragm member 20 has an intermediate diaphragm portion 36, which is shown as of a general bellows-like or folded shape to provide flexibility and compressibility to accommodate axial seal loading to be further described, extends generally axially and radially inward from the diaphragm sleeve 22.

The intermediate portion 36, at its end spaced from the sleeve portion 22, carries a second sleeve-like portion 38, the sleeve-like portion 38 being of a general ring-like shape and disposed freely about the shaft 16.

A side face 40 of the sleeve portion 38 is shown as of a general semi-toroidal configuration. This side face 40 provides one of the relatively rotating seal faces. As shown, it engages a generally radially extending member rigid with the shaft 16; and in the embodiment illustrated in Figure 1, the member so engaged by the side face 40 of sleeve 38 is the inner race member 44 of bearing 18.

An important feature of the present invention is the feature whereby the side face 40 which provides the sealing contact with the bearing member 44 is formed of some elastomer or elastomeric material, such as rubber or rubber-like pliable material, which is adapted to become smoothly polished or glaze-hardened as a result of heat developed by frictional contact with the relatively rotating bearing member 44. Thus, as the seal "wears in," it develops a glazed and hardened surface 40 to create a very long-wearing, smooth and effective seal surface. This condition is diagrammatically indicated by the illustration of Figure 5 wherein it will be observed that the side surface 40 has acquired a flat, dense, glazed condition as indicated by reference numeral 46. The glazed surface 46 reduces friction to such an extent that a cool running seal is developed.

The integral, elastomeric seal ring construction shown is of particular advantage, because the flexibility of the seal is obtained by the flexibility and elasticity of the seal ring body, and the glaze-hardening is obtained by the characteristics of such material under loaded frictional contact. Thus important different characteristic features of the present invention are attained with economy, According to another feature of the present invention, the sleeve portion 38 carries a ring 50 or the like shown as embedded integrally with the sleeve 38. Desirably, the ring 50 is rigid to provide a reinforcement of the sleeve 38 and to provide full ring contact of the contact face 40 which seals against the bearing member 44. However, different operating characteristics may be obtained according to the material from which the ring 50 is formed. Thus it may be desirable that the ring 50 be formed of a material having some heat-insulating characteristics, such as asbestos or some hard plastic, or synthetic material, such as "Teflon" (i.e. polytetrafluoroethlene), or the like. The insulating effect of the ring 50 avoids undue heat transmission from the sealing surface 40 to the intermediate bellows 36 of diaphragm 20, to permit it to retain its flexibility. Or the ring may be formed to provide certain heat-dissipating characteristics, as by forming the ring from metal. This is found to assure a circumferential equalization of the glaze hardening imparted to the seal surface.

The ring 50, as is best indicated in Figure 4, is desirably provided with a series of circumferentially spaced openings 52 to provide better adherence and integralness of the portions of sleeve 38 on both sides of the ring 50.

A spring 54 is shown to provide axial loading of the seal, as desired to cause the surface 40 to thrustingly engage the bearing member 44. Accordingly, one end of spring 54 is shown as bottomed against a flange 56 radially extending inwardly from the reinforcing band 26, and from an edge of the intermediate portion 28 remote from the edge from which the annular flange 30 extends. The opposite end of spring 54 bottoms against a radially extending surface 58 of the diaphragm sleeve 38, with the force of spring 54 of being transmitted to the sealing surface 40 through the ring 50 to provide the full-ring force desired.

An inner portion of the sleeve 38 is formed with an annular extension or flange as indicated at 60, to retain the spring 54 seated properly against its bottoming surface 58 of the sleeve 38.

Since the embodiments as shown in Figures 1 and 2 are generally identical in most respects, similar but primed reference numerals are employed to identify corresponding parts of the two embodiments, and the description of such parts in connection with first embodiment applies to the modified form illustrated in Figure 2 except as otherwise noted.

Accordingly, referring to Figure 2, it will be observed that a diaphragm-like annular ring 20 is shown as seated in a shell 12' to provide a seal between a wall 14' and a shaft 16' which extends through the wall.

In Figure 2, however, the means which extend from the shaft 16 to be sealingly engaged by the seal surface 40' of diaphragm 20', is not a bearing member, but rather, takes the form of a hard annular ring 70 held to and sealed to the shaft 16' as by a resilient sealing annulus or washer 72. The ring 70 provides a radially extending surface 74 against which the contact surface 40' rubbingly engages to glaze harden that surface 40' upon relative rotation of the axially loaded contact surfaces 40'—74.

A sealing device constructed according to either of the embodiments herein illustrated provides an effective yet economical seal between relatively rotating members. As the seal "wears in," its sealing characteristics are enhanced by the hardening or glazing acquired by the elastomeric contact face, which upon relative rotation under load acquires the desired hardened and smoothly polished surface as described above.

It will thus be seen from the foregoing description, considered in conjunction with the accompanying drawings, that the present invention provides a new and improved sealing means and method having the desired advantages and characteristics, and accomplishing its intended objects, including those hereinbefore pointed out and others which are inherent in the invention as described.

It will be understood that modifications and variations may be effected without departing from the scope of the novel concepts of the present invention.

I claim as my invention:

1. The method of developing a smooth wear resistant seal face having a low co-efficient of friction on an elastomeric seal ring of a seal of the relatively rotating face to face engaging type which comprises providing an elastomeric seal ring with a soft deformable nose portion and a flexible diaphragm portion, insulating the nose portion from the diaphragm portion, spring loading the soft deformable nose portion of the elastomeric seal ring against a hard surface, relatively rotating the nose and surface, loading the nose sufficiently against the hard surface to conform the nose to said surface in good sealing relation therewith, continuing said loading and said relative rotation of the nose and hard surface to develop an elevated glaze hardening temperature for the nose, confining the glaze hardening temperature to the nose, glaze hardening the surface of said nose and thereby reducing the co-efficient of friction between the nose and said surface for providing a cool running wear resisting seal, and retaining the flexibility of the diaphragm portion.

2. A shaft seal comprising a first seal member having an annular smooth hard sealing face, a second seal member having a nose of elastomeric material engaging said sealing face in full conforming sealing relation therewith, said nose being heat sensitive to develop a hard glazed surface thereon under the influence of frictional heat when riding on said sealing face of the first member, said second member having a deformable peripheral portion adapted to be sealingly engaged with a support or the like to form a fluid barrier, said second member having a flexible diaphragm portion between said peripheral portion and said nose, a rigid annular reinforcing member between said nose and said diaphragm portion and imbedded in said second member to back up said nose and insulate the nose from the diaphragm portion, spring means acting on said second member behind said rigid member for urging said nose against said first seal member under sufficient load to develop a localized heat hardening temperature for glazing the nose upon relative rotation of the first and second members, and said rigid member forming an interruption for the heat flow from the nose to the diaphragm to maintain a cool running seal.

3. The method of making seals of the relatively rotating face to face engaged type which comprises providing a first seal ring with a smooth hard rigid sealing face, providing a second seal ring of elastomeric material with a deformable periphery, a partially cured heat hardenable nose and a flexible intermediate diaphragm between the nose and periphery, insulating the nose from the diaphragm, urging the nose against the smooth hard rigid surface of the first ring under sufficient load to conform said nose with the surface of said ring in full mated together sealing relation, relatively rotating the first and second rings to heat said nose to a sufficiently elevated temperature for forming a glazed skin on the nose, confining said temperature to said nose to retain the flexibility of the diaphragm, and thereafter continuing said rotation with the nose at a reduced temperature caused by the reduced co-efficient of friction between the glazed skin and said rigid smooth surface of the first ring.

References Cited in the file of this patent

UNITED STATES PATENTS

| | | |
|---|---|---|
| 1,901,044 | Schmidt et al. | Mar. 14, 1933 |
| 2,294,105 | Wallgren | Aug. 25, 1942 |
| 2,522,231 | Loftis | Sept. 12, 1950 |
| 2,744,772 | Amirault et al. | May 8, 1956 |